(12) United States Patent
Costesso et al.

(10) Patent No.: US 7,662,234 B2
(45) Date of Patent: *Feb. 16, 2010

(54) METHOD FOR PURIFICATION OF HIGH PURITY SUCROSE MATERIAL

(75) Inventors: Dennis D. Costesso, Ogden, UT (US); Michael M. Kearney, Twin Falls, ID (US)

(73) Assignee: Amalgamated Research LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/543,511

(22) Filed: Oct. 5, 2006

(65) Prior Publication Data

US 2007/0023033 A1    Feb. 1, 2007

Related U.S. Application Data

(63) Continuation of application No. 10/888,155, filed on Jul. 9, 2004, now Pat. No. 7,125,455.

(60) Provisional application No. 60/487,706, filed on Jul. 16, 2003.

(51) Int. Cl.
*C13D 3/14* (2006.01)
(52) U.S. Cl. .................................. 127/46.2; 127/30
(58) Field of Classification Search .............. 127/30, 127/46.2
See application file for complete search history.

(56) References Cited

U.S. PATENT DOCUMENTS

| 2,261,920 | A | 11/1941 | Graff et al. |
| 2,334,126 | A | 11/1943 | Reichert et al. |
| 4,359,430 | A | 11/1982 | Heikkila et al. |
| 4,412,866 | A | 11/1983 | Schoenrock et al. |
| 5,466,294 | A | 11/1995 | Kearney et al. |
| 6,187,204 | B1 | 2/2001 | Heikkild et al. |
| 6,602,420 | B2 | 8/2003 | Kearney et al. |
| 7,009,076 | B2 | 3/2006 | Paananen et al. |
| 7,125,455 | B2 * | 10/2006 | Costesso et al. ............ 127/46.2 |
| 2001/0001178 | A1 * | 5/2001 | Donovan et al. ............... 127/55 |

FOREIGN PATENT DOCUMENTS

| WO | WO 96/10650 | 4/1996 |
| WO | WO 98/32514 | 7/1998 |

OTHER PUBLICATIONS

Rearick, et al., Stimulated moving-bed technology in the sweetener industry, CHEMTECH, The Magazine of Innovation in Chemistry and Technology, Sep. 2007, pp. 36-40 (highlighted portion on p. 38), published by the American Chemical Society.

* cited by examiner

*Primary Examiner*—David M Brunsman
(74) *Attorney, Agent, or Firm*—Westman, Champlin & Kelly, P.A.

(57) ABSTRACT

A method for purifying a sucrose material already in a high purity liquid, crystalline or other form of sucrose, such as raw sugar, utilizing chromatography, or utilizing chromatography in connection with other methods of purification.

33 Claims, 2 Drawing Sheets

METHOD FOR PURIFICATION OF HIGH PURITY SUCROSE MATERIAL

CROSS-REFERENCE TO RELATED APPLICATIONS

This application is a continuation of U.S. patent application Ser. No. 10/888,155, filed Jul. 9, 2004, now U.S. Pat. No. 7,125,455, which application claims the benefit of U.S. Provisional Application Ser. No. 60/487,706, filed Jul. 16, 2003, the contents of the entirety of which is incorporated herein by this reference.

TECHNICAL FIELD

This invention pertains to the removal of impurities from a high purity sucrose material, including raw sugar as typically produced by the cane sugar industry.

BACKGROUND

The standard method used to refine, for example, raw sugar to levels acceptable for marketing as white sugar and/or use in food products is through crystallization methods. Less practiced methods include ion exchange, chemical precipitation or carbon absorption. Raw sugar usually includes sugar in crystalline form produced from sugar cane, and may be in a moist or in a liquid form where taken from a refining process prior to crystallization or in liquid form by dissolving raw sugar in crystalline form in water.

As an example only, a source of sugar is sugar cane. Harvested sugar cane typically is sent to a raw sugar mill. The sugar cane is processed in a shredder to break apart the cane and rupture juice cells. Rollers extract sugar juice from the fibrous material, typically called bagasse. The bagasse may be recycled as a fuel for the mill boiler furnaces, or can be used as a raw materials source for the production of chemicals such as furfural and ethanol. It is also used in the production of fibrous materials such as wood products and paper, and as animal feedstuffs.

Sugar juice is purified before concentration by boiling in an evaporator. The concentrated juice or syrup is concentrated further and seeded with small sugar crystals in a crystallization process. Sugar crystals are grown to a required size by adding syrup during boiling. A syrup is separated from these raw sugar crystals in centrifugals, and a molasses is typically left over from the final centrifuging. This raw sugar from the centrifugals typically is dried and transferred for storage.

A current practice of certain industrial scale food and/or beverage producers that utilize sugar is, for economic reasons, to purchase a high purity sugar product on the market from time to time that is in a form not yet suitable for use in food production, because such sugar product, e.g., contains impurities such as color and ash components. Such producers, while saving cost in purchasing such sugar for food and/or beverage production, usually also desire a whiter appearing sugar for their use in food and/or beverage production. Raw sugar, for example, while substantially pure in sucrose, typically is not considered fit for direct use as food or a food ingredient due to the impurities it ordinarily contains. As stated, high purity sucrose material such as raw sugar currently has been purified by non-chromatographic processes such as a process utilizing affination in which raw sugar is mixed with hot concentrated syrup to soften outer coating crystals, which are then separated from syrup by centrifugation. Crystals are discharged from the centrifuge and dissolved in hot water to form a sugar liquor.

The melted sugar liquor is purified with either a carbonation or phosphatation process which traps suspended impurities in larger particles that are easier to separate from the sugar liquor. Carbonatation adds carbon dioxide and lime to melted sugar to form a precipitate of calcium carbonate. Carbonatation precipitate is removed, for instance, by pressure filtering sugar liquor through cloth in a pressure leaf filter, leaving a straw-colored, crystal clear liquid. Phosphatation adds phosphoric acid to melted sugar and removes precipitate as a layer from a flotation clarifier. Phosphatated liquor is generally filtered through sand in a deep bed filter to remove residual precipitate left after clarification. This liquid then passes through decolorizing columns which adsorb the colorant molecules. A clear liquid is concentrated by boiling in a vacuum pan, and then seeded with fine sugar crystals and grown to a desired size by adding liquor. When crystals are a desired size, crystals and syrup are discharged from the pan. The mixture of crystals and syrup is processed in centrifuges where crystals are separated from syrup. Separated syrup is boiled again and more sugar crystals are extracted from it, and repeated. Refined sugar crystals are dried by tumbling them through a stream of air, then graded and packaged. Other purification methods include sulfitation processes and processes known as Talofoc and Talodura processes which use phosphotation and cationic surfactants or polyacrylaimides for color removal.

Industrial applications of chromatographic separations are typically applied to a feedstock in order to separate constituents present in significant quantities. For example, a commonly practiced application of chromatography in the sugar industry is to recover sugar from molasses. Sugar in molasses, which makes up approximately 60% of the dissolved solids, is separated from non-sugars that make up the remaining 40% of the dissolved solids.

U.S. Pat. No. 4,412,866 describes an example of the operation of chromatographic simulated moving bed (or sometimes called "SMB") method to separate the components of a feed stock. A resin bed is divided into a series of discrete vessels, each of which functions as a zone within a circulation loop. A manifold system connects the vessels and directs, in appropriate sequence to (or from) each vessel, each of the four media accommodated by the process. Those media are generally referred to as feed stock, eluent, extract and raffinate, respectively. As applied to a sugar factory, a typical feed stock is a lower purity sucrose solution, the eluent is water, the extract is an aqueous solution of sucrose and the raffinate is an aqueous solution containing nonsucrose, such as salts and high molecular weight compounds. The simulated moving bed disclosed by the '866 patent is of the type sometimes referred to as a "continuous SMB."

An example of a batch chromatographic method is described in the disclosure of U.S. Pat. No. 4,359,430, which utilizes sucrose feedstocks derived from sugar beets at purities of approximately 7% to 60% sucrose. See also, e.g., U.S. Pat. No. 5,466,294, which utilizes a "soft raw syrup" as a feedstock to a chromatographic method which is not in a high purity form at a less than 89% purity sucrose on a dry solids basis, i.e., approximately 11% non-sucrose impurities.

SUMMARY OF THE INVENTION

The use of chromatography to purify already high purity sucrose material, however, has not been known to have been considered by those in the art because the impurities in raw sugar, for instance, are present at a very low level quantities and/or percentages on a dry solids basis. We have unexpectedly discovered that a chromatography process or processes can be cost effectively used to separate the relatively small quantities of non-sucrose impurities such as ash components and color present in a high purity sucrose material, such as raw sugar. A major cost prohibitive aspect of using chromatography for the application, the common step of concentration of water from the product streams of chromatography, is typically eliminated by producing a sugar product stream which is sufficiently high in solids concentration such that it requires little or no subsequent concentration and a waste stream which is sufficiently low in solids that it can be sent directly to water disposal facilities with little or no concentration required.

The sugar in raw sugar, for example, typically makes up 98% to 99% of the total dissolved solids or could be lower, such as 96%. Given this purity level, the use of chromatography to remove a 1% or 2% contaminant of other constituents or even higher would be considered economically unfeasible to those of ordinary skill in the art. High purity sucrose material is at a sufficient high concentration level which to those of ordinary skill would be considered as necessitating non-chromatographic methods to achieve further refinement of the sucrose material to obtain, e.g., color or ash component removal. As used herein, the term "high purity sucrose material" will be used to refer to a concentration of sucrose in a material, that is at least about 90% of the total dissolved solids on a dry solids basis.

In one embodiment, a process for purifying a high purity sucrose material comprises feeding a stream of a high purity sucrose material to a chromatographic process in a system comprising one or more chromatographic columns or beds. The process further includes producing at least a first product stream and a second product stream from the chromatographic process, wherein the first product stream comprises a higher concentration of the sucrose on a dry solids basis than the stream comprising the high purity sucrose material and a higher concentration of the sucrose on a dry solids basis than the second product stream, and wherein the second product stream comprises a higher concentration of one or more non-sucrose components than the first product stream.

As for product quality, we have found that utilizing a chromatography method, the quality of the sugar stream is improved such that substantial amounts of essentially all of the ash components are removed along with approximately 70% or more of the color. It also may be desirable to adjust the level of color removal by the method to satisfy the desired color level of consumers or food producers. This method may also be applicable to any number of high purity sucrose materials that have been already partially refined by non-chromatographic methods (or, e.g., intentionally colorized purified sugar) and still containing impurities, e.g., color, including for example turbinado, demerara, muscovada, or brown sugars.

Our method of utilizing chromatography for purification offers a selection of several unique economic advantages over conventional processes. For instance, no chemicals for processes such as carbonation, sulfitation, or phosphotation are used and water is used for diluting and as an eluent in the separation process. The purified sugar product stream is relatively high in dissolved solids. Therefore, evaporation requirements for this stream may be relatively small or not necessary. The non-sugar stream contains most of the water and low amounts of dissolved solids and may be sent on to water treatment or water disposal facilities with little or no prior treatment, eliminating the need to expend substantial energy for evaporation.

In applications such as soft drink bottling, the final product, in the liquid stage, can be used directly, by-passing the need for crystallization. Thus, in another embodiment, the final product may be mixed with a food product such as, for example, soda pop.

DETAILED DESCRIPTION OF THE INVENTION

Figure 1A:
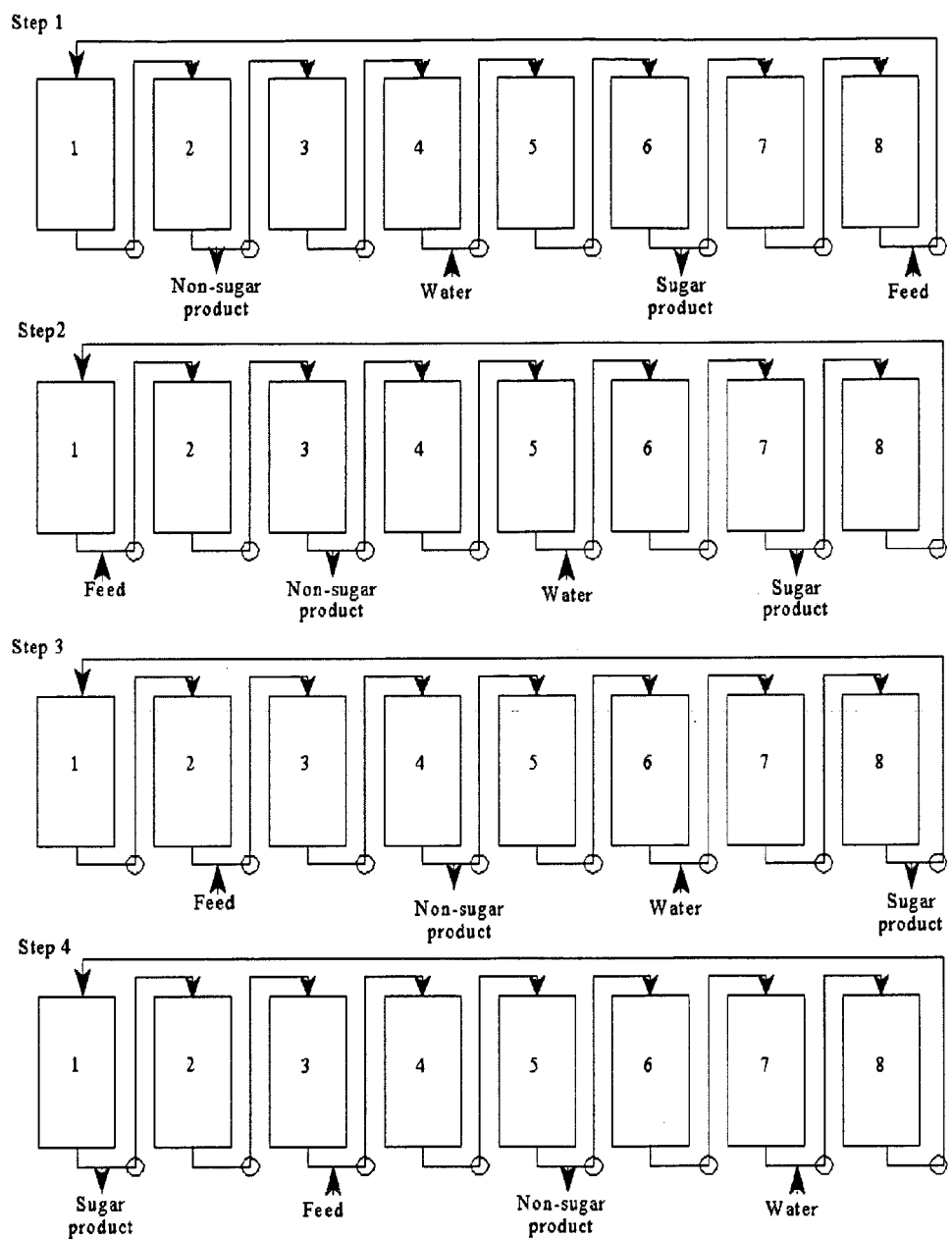
FIG. 1 is an illustration of the configuration of a simulated moving bed utilized for the chromatography in the Example.

There are a number of embodiments of our invention which can be used to further purify high purity sucrose material utilizing chromatography. One embodiment includes a process whereby a high purity sucrose material, e.g., raw sugar, is conveyed to a melter tank and mixed with an eluent such as, for example, water that is approximately 60 degrees centigrade. If the resulting solution has an acidic pH, addition of a base, such as, for example, sodium hydroxide, may be used to raise the pH of the resulting solution from about 7.0 to 8.0. The higher pH will slow the conversion of sucrose to fructose and glucose if the solution is later held at higher temperatures for extended periods of time.

A 60% to 70% dissolved solids solution is, thus, produced. The raw sugar derived syrup is separated from any insoluble material using a filter or centrifuge. With regard to filtration, systems such as pressure leaf, vacuum drum or plate and frame are acceptable. Membrane filters which can be used in a membrane treatment include micro-filtration, ultra-filtration and nano-filtration. In another embodiment, the membrane treatment may include reverse osmosis. The resulting raw syrup is passed through check filtration if residual suspended solids are present, and degassed if oxygen is present. Optionally, the resulting raw syrup may be subjected to ion exchange before feeding to the SMB chromatography system. This may be useful, for example, for removing the divalent cations from the syrup over time which could result in a slow deterioration of the chromatographic separation. In this case, weak or strong cation exchange softening is appropriate.

The feed syrup may also be subjected to ion exchange prior to entering the separator. Ion exchange is commonly used prior to chromatography and is well known as a chromatography pre-treatment by those of ordinary skill in the art. For example, divalent cations may be exchanged for monovalent cations in cases for which a monovalent form chromatography resin is used.

In other embodiments, the composition comprising the eluent and the high purity sucrose material may be melted before filtration. In yet an additional embodiment, the composition including the eluent and the high purity sucrose material may be subjected to a process to reduce the content of matter that may plug a resin used in a subsequent chromatography process. The process may include pressure filtration, rotary drum filtration, membrane filtration, centrifugation or combinations of any thereof.

A filtered and/or degassed raw syrup is fed to a chromatographic separator to remove part of the ash and color from the solution. The chromatographic separator may include a batch type operation or the generally more efficient simulated moving bed operation, and operated using continuous internal recirculation. Examples of simulated moving bed processes are disclosed, for instance, in U.S. Pat. No. 6,379,554 (method of displacement chromatography); U.S. Pat. No. 5,102,553 (time variable simulated moving bed process), U.S. Pat. No. 6,093,326 (single train, sequential simulated moving bed process); and U.S. Pat. No. 6,187,204 (same), each of the contents of the entirety of which is incorporated herein by this reference.

The number of columns or beds is 1 to 8. A column may comprise one or several beds containing chromatographic media. Those feed tanks, filters, piping connecting flow between columns and/or beds where so connected, pumps, valving, pressure regulators, metering equipment, flow control and microprocessor equipment utilized in one embodiment are well known in construction and function to those of ordinary skill in the art. The chromatographic media may be a cation ion exchange resin, such as a DIAION UBK-530 (Na), available from Mitsubishi chemicals, which is a strong acid cation resin. Other non-limiting examples of chromatographic separation resins include Rohm and Haas 1310 and 1320 resins, Purolite PCR resins and DOWEX monosphere chromatographic resins.

Figure 1B:
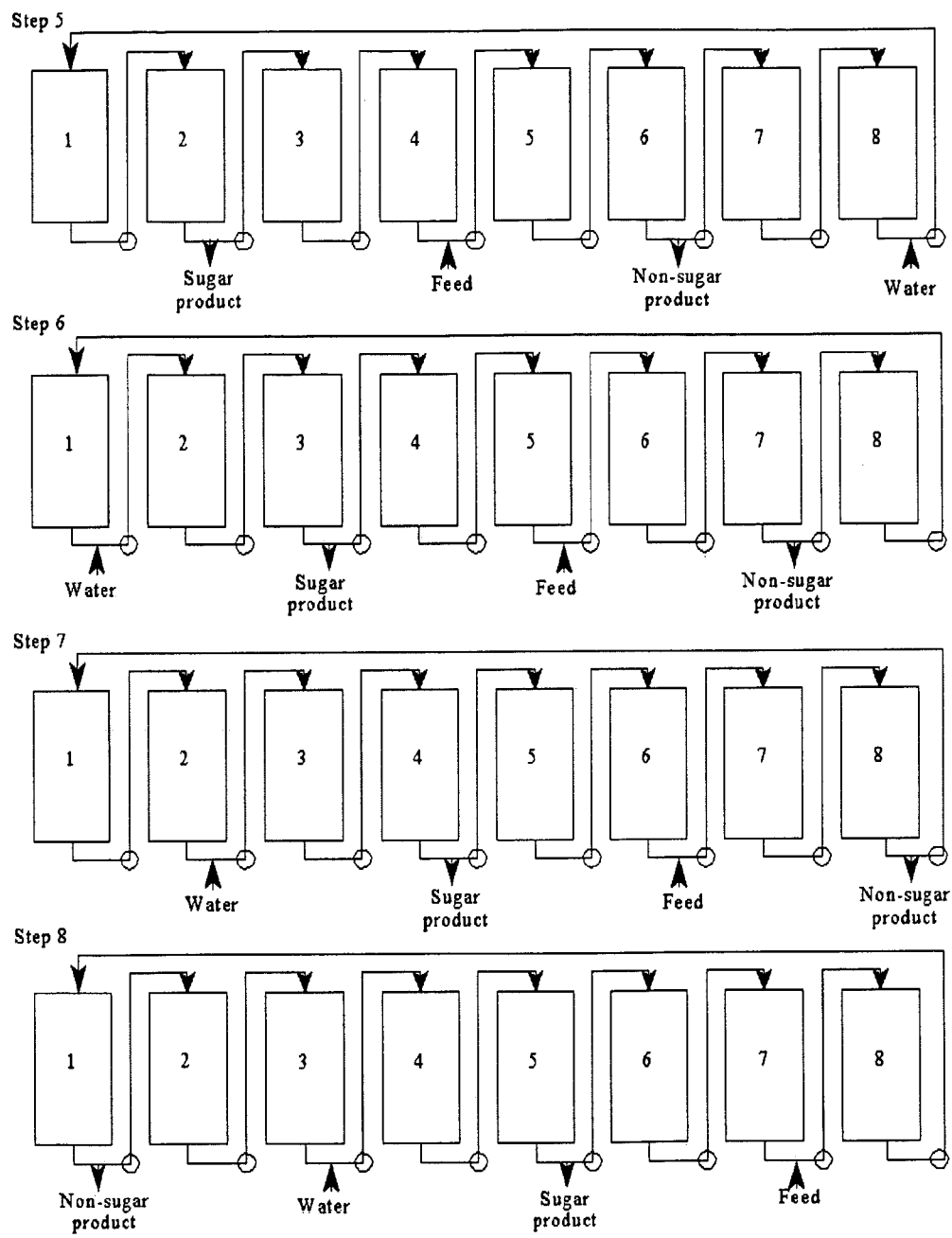

In one embodiment, the steps of an 8 column system are as shown in FIG. 1. These steps are managed by a microprocessor which controls the appropriate valve opening/closing, flow rates, and pressures. Those of ordinary skill in the art will appreciate multiple alternative arrangements of such steps to optimize the disclosed process for particular needs and feedstock materials after reading this disclosure.

Water is used as the chromatographic eluent for a chromatographic process. Other eluents that perform functions the same as or similar to water known to those of ordinary skill in the art are also contemplated herein. Depending on the configuration of the chromatographic separator, any number of product streams may be obtained. Usually, however, two streams are taken from the separator. These are an extract which is high quality sugar product, and raffinate which is non-sugar product.

Depending on the original quality of the high purity sucrose material, the extract stream from the chromatography step may require further purification, clean-up or polishing, usually to remove residual color. Addition of final polishing represents separate embodiments of our invention. If desired, we recommend that the optional polishing step include one or more of the following known color removal methods: ion exchange, absorption, chemical treatment, carbon treatment or membrane treatment. Chemical treatment can include the addition of oxidizing agents, such as hydrogen peroxide wherein 0.1% to 0.15% on weight is our recommended dosage. An example of membrane treatment is the employment of nano-filtration membranes which can remove small remaining colored compounds.

Evaporation of, or water removal from raffinate, will be unnecessary where low in dissolved solids and desired to, e.g., send to water treatment or water disposal facilities; although one of ordinary skill in the art may desire, e.g., to evaporate such stream for commercial reasons to concentrate remaining solids.

Further purification methods may include filtration, evaporation, distillation, drying, gas absorption, solvent extraction, press extraction, adsorption, crystallization, and centrifugation. Other purification methods may include further chromatography according to this invention utilizing batch, simulated moving bed (including continuous, semi-continuous, or sequential), such simulated moving bed utilizing more than one loop, utilizing more than one profile, less than one profile, or combinations of any of the forgoing as will be appreciated for application with this invention by those of ordinary skill in the art after reading this disclosure. In addition, further purification can include combinations of any of the forgoing, such as for example, combinations of different methods of chromatography, combinations of chromatography with filtration, or combinations of membrane treatment with drying.

The following example is given to illustrate the present invention. This Example is given for illustrative purposes, and the invention embodied therein should not be limited thereto.

EXAMPLE I

As Applied to Raw Sugar

A raw sugar derived from cane sugar processing was treated by this invention. In other embodiments, the raw sugar may originate from other sources including, but not limited to, beet sugar. The purpose was to remove color from the raw sugar. A pilot scale simulated moving bed was used for the chromatography and it was configured as illustrated in FIG. 1. The SMB system was operated using continuous internal recirculation. The SMB columns were filled with Mitsubishi UBK-530 which is a strong cation resin. The system was loaded at 167 lbs dissolved solids per cubic feet resin/day. Total resin volume for the test was 0.46 cubic feet distributed equally among the 8 columns. Other parameters are listed in Table 1.

TABLE 1

Operating Parameters

| | |
|---|---|
| Step time | 4 minutes |
| Eluent | Water at a ratio of 3.0 water to 1.0 feed on a volume to volume basis |
| Operating temperature | 60° Centigrade |
| Product ratio | 1.0 ratio of extract product collected to raffinate collected on a volume to volume basis |

Prior to chromatography, the dissolved raw sugar was filtered using a plate and frame filter. The system was operated until equilibrium conditions were reached. The purpose of the operation was to remove significant color from the raw sugar. The results are reported in Table 2 and Table 3.

TABLE 2

Color, Dry Solids, Turbidity

| Stream | Color (ICUMSA - International Commission for Uniform Methods of Sugar Analysis) | Dry Solids % | Turbidity (absorbance at 720 nm and based on dissolved solids) |
|---|---|---|---|
| Feed | 480 | 66.5 | 52 |
| Extract | 160 | 35.6 | 1 |
| Raffinate | 6600 | 2.1 | 634 |

% Color elimination by material balance (includes weights of materials) = 69.3%

TABLE 3

Apparent Purity

| Stream | Apparent purity |
|---|---|
| Feed | 99.2% |
| Extract | 99.6% |
| Raffinate | 97.1% |

The raffinate stream was relatively low in dissolved solids and, if desired, may be sent for processing in, e.g., water treatment or water disposal facilities. The extract stream was relatively high in dissolved solids and relatively low in color.

While the above invention has been described with reference to certain embodiments, the scope of the present invention is not limited to these embodiments. One of ordinary skill in the art may find variations of these embodiments which may, nevertheless, fall within the scope of the present invention, whose scope is defined by the claims set forth below.

What is claimed is:

1. A method for purifying a high purity sucrose material, the method comprising:
   degassing a stream comprising a high purity sucrose material;
   dissolving said high purity sucrose material in an eluent;
   feeding said stream to a chromatographic process in a system comprising one or more chromatographic columns or beds, said chromatography process being selected from the group consisting of batch chromatography, simulated moving bed, continuous simulated moving bed, semi-continuous simulated moving bed, time variable simulated moving bed, sequential simulated moving bed and combinations of any thereof; and
   producing at least a first product stream and a second product stream from said chromatographic process, wherein said first product stream comprises a higher concentration of said sucrose material on a dry solids basis than said stream comprising said high purity sucrose material and a higher concentration of said sucrose material on a dry solids basis than said second product stream, and wherein said second product stream comprises a higher concentration of one or more non-sucrose components than said first product stream.

2. The method according to claim 1, further comprising:
   dissolving said high purity sucrose material in an eluent;
   melting said high purity sucrose material; and
   filtering said high purity sucrose material prior to feeding said stream to said chromatographic process.

3. The method according to claim 1, wherein said chromatographic process utilizes a water solution as the eluent.

4. The method according to claim 1, further comprising subjecting said high purity sucrose material to a process to reduce the content of matter in said stream fed to said chromatographic process, wherein said matter may result in plugging a resin used in said chromatographic process.

5. The method according to claim 4, wherein said process to reduce the content of said matter is selected from the group consisting of: pressure filtration, rotary drum filtration, membrane filtration, centrifugation and combinations of any thereof.

6. The method according to claim 1, further comprising subjecting said stream fed to said chromatographic process to ion exchange prior to feeding said stream to said chromatographic process.

7. The method according to claim 1, wherein at least one of said product streams is subjected to a subsequent polishing step selected from the group consisting of: ion exchange, absorption, chemical treatment, carbon treatment, membrane treatment and combinations of any thereof.

8. The method according to claim 7, wherein the chemical treatment comprises adding hydrogen peroxide.

9. The method according to claim 7, wherein the membrane treatment is selected from the group consisting of: microfiltration, nano-filtration, ultra-filtration, reverse osmosis and combinations of any thereof.

10. The method according to claim 1, wherein said high purity sucrose material is raw sugar produced from cane sugar processing.

11. The method according to claim 1, wherein said high purity sucrose material is selected from the group consisting of: turbinado sugar, demerura sugar, muscovada sugar, brown sugar, and combinations of any thereof 12. The method according to claim 1, further comprising partially refining said high purity sucrose material by non-chromatographic methods prior to feeding said stream to said chromatographic process.

13. The method according to claim 1, further comprising subjecting at least one of said product streams to further processing in a separate system by one or more methods selected from the group consisting of: chromatography, filtration, membrane treatment, evaporation, distillation, drying, gas absorption, solvent extraction, press extraction, adsorption, crystallization, centrifugation and combinations of any thereof.

14. The method according to claim 1, wherein at least one of said product streams has a color rating of less than 200 on a United States ICUMSA scale.

15. The method according to claim 1, wherein a percentage of sucrose in said high purity sucrose material comprises at least 96% of the total dissolved solids.

16. The method according to claim 1, wherein the eluent is approximately 60° C.

17. The method according to claim 1, further comprising mixing the first product stream with a food product.

18. A method for purifying a high purity sucrose material, said method comprising:
   dissolving a high purity sucrose material in an eluent to form a steam;
   feeding said stream containing said high purity sucrose material to a chromatographic process in a system comprising one or more chromatographic columns or beds, said chromatography process being selected from the group consisting of batch chromatography, simulated moving bed, continuous simulated moving bed, semi-continuous simulated moving bed, time variable simulated moving bed, sequential simulated moving bed and combinations of any thereof; and
   producing at least a first product stream and a second product stream from said chromatographic process, wherein said first product stream comprises a higher concentration of said sucrose material on a dry solids basis than said steam comprising said high purity sucrose material and a higher concentration of said sucrose material on a dry solids basis than said second product stream; and wherein said second product stream comprises a higher concentration of one or more non-sucrose components than said first product stream;
   wherein said high purity sucrose material is selected from the group consisting of: turbinado sugar, demerara sugar, muscovada sugar, brown sugar, and combinations of any thereof.

19. The method according to claim 18 further comprising:
   dissolving said high purity sucrose material in an eluent;
   melting said high purity sucrose material; and
   filtering said high purity sucrose material prior to feeding said stream to said chromatographic process.

20. The method according to claim 18 wherein said chromatographic process utilizes a water solution as the eluent.

21. The method according to claim 18 further comprising subjecting said high purity sucrose material to a process to reduce the content of matter in said stream fed to said chromatographic process, wherein said matter may result in plugging a resin used in said chromatographic process.

22. The method according to claim 21 wherein said process to reduce the content of said matter is selected from the group consisting of: pressure filtration, rotary drum filtration, membrane filtration, centrifugation and combinations of any thereof.

23. The method according to claim 18 further comprising subjecting said stream fed to said chromatographic process to ion exchange prior to feeding said stream to said chromatographic process.

24. The method according to claim 18 wherein at least one of said product streams is subjected to a subsequent polishing step selected from the group consisting of: ion exchange, absorption, chemical treatment, carbon treatment, membrane treatment and combinations of any thereof.

25. The method according to claim 24 wherein the chemical treatment comprises adding hydrogen peroxide.

26. The method according to claim 24 wherein the membrane treatment is selected from the group consisting of: micro-filtration, nano-filtration, ultra-filtration, reverse osmosis and combinations of any thereof.

27. The method according to claim 18 wherein said high purity sucrose material is raw sugar produced from cane sugar processing.

28. The method according to claim 18 further comprising partially refining said high purity sucrose material by non-chromatographic methods prior to feeding said stream to said chromatographic process.

29. The method according to claim 18 further comprising subjecting at least one of said product streams to further processing in a separate system by one or more methods selected from the group consisting of: chromatography, filtration, membrane treatment, evaporation, distillation, drying, gas absorption, solvent extraction, press extraction, adsorption, crystallization, centrifugation and combinations of any thereof.

30. The method according to claim 18 wherein at least one of said product streams has a color rating of less than 200 on a United States ICUMSA scale.

31. The method according to claim 18 wherein a percentage of sucrose in said high purity sucrose material comprises at least 96% of the total dissolved solids.

32. The method according to claim 18 wherein the eluent is approximately 60° C.

33. The method according to claim 18 further comprising mixing the first product stream with a food product.

* * * * *